(12) United States Patent
Lopez (10) Patent No.: US 6,942,295 B1
(45) Date of Patent: Sep. 13, 2005

(54) RECLINING CHAIR SYSTEM

(76) Inventor: Guillermo E. Lopez, Avenida 5BN #20N-65, Cali Valle (CO)

( * ) Notice: Subject to any disclaimer, the term of this patent is extended or adjusted under 35 U.S.C. 154(b) by 40 days.

(21) Appl. No.: 10/851,799

(22) Filed: May 24, 2004

(51) Int. Cl.[7] .................. A47C 1/024; A47C 1/02; F16F 7/00
(52) U.S. Cl. ............. 297/300.1; 297/326; 297/316; 297/300.3; 297/300.5; 297/302.1; 297/302.2; 297/302.4; 267/141.1
(58) Field of Search ............. 297/300.2, 300.3, 297/300.5, 301.2, 301.4, 302.2, 302.4, 302.1, 297/326, 327, 316; 248/618, 619; 267/141.1, 267/293, 294

(56) References Cited

U.S. PATENT DOCUMENTS

| | | | | |
|---|---|---|---|---|
| 1,767,042 A | * | 6/1930 | Bitzenburger | ............ 297/301.4 |
| 2,595,582 A | * | 5/1952 | Hoven et al. | ............ 297/302.4 |
| 2,628,662 A | * | 2/1953 | Morris et al. | ............... 297/323 |
| 4,200,332 A | * | 4/1980 | Brauning | ................. 297/300.3 |
| 5,040,846 A | | 8/1991 | Finney et al. | ................ 297/258 |
| 5,288,128 A | | 2/1994 | Smith et al. | ................. 297/332 |
| 5,584,533 A | * | 12/1996 | Schrewe | ................... 297/300.2 |
| 5,681,085 A | * | 10/1997 | Nahoul | .................... 297/302.4 |
| 6,443,437 B1 | * | 9/2002 | Beyene et al. | ............ 267/64.26 |
| 2003/0102703 A1 | * | 6/2003 | Tenenboym et al. | ........ 297/326 |

* cited by examiner

Primary Examiner—Peter M. Cuomo
Assistant Examiner—Sarah C. Burnham
(74) Attorney, Agent, or Firm—J. Sanchelima; A. Bordas (57) ABSTRACT

A reclining chair system with a standard assembly supporting seat and backrest assemblies, which are pivotally mounted to each other and capable of providing a rocker effect to a user. A strut assembly provides substantially a bounce free shock absorbing function by using two coaxially disposed compressible and resilient members that are compressed sequentially. A headed shaft with a step limits the compression of the first member. The arrangement permits a volumetrically efficient operation while preventing excessive fatigue of the member. An adjustment mechanism permits a user to readily set the relative angular position of backrest and seat with respect to the standard (and consequently the horizontal plane) depending on the location of the chair system.

9 Claims, 13 Drawing Sheets

Fig 6C Maximum Compression

Fig 6B Compression at 30%

Fig 6A Assembled

RECLINING CHAIR SYSTEM

BACKGROUND OF THE INVENTION

1. Field of the Invention

The present invention relates to a system for a reclining chair, and more particularly, to such a system that is substantially bounce free and adjustable.

2. Description of the Related Art

Many systems for reclining chairs have been developed in the past. Their purpose is to provide extra-comfort, involving diverse reclining mechanisms, which make events, such as watching movies, a more enjoyable experience. These reclining mechanisms may be classified in two types: "Rockers" (those that involve simultaneous reclining of the backrest and seat assemblies) and "loungers" (those which only recline the backrest), according to industry terms and definitions. In general, they allow a user to lean backwards as he or she sits in, and recuperate their original (upright) position when he or she leans forward and/or stand up. Available cinema "rocker" or "lounger" chairs in the art, however, involve reclining actions that are either bouncy, "springy", hard to—effortlessly—operate or do not provide a stable and comfortable position to the user.

On the other hand, mainstream cinema "rockers" and "loungers", that include a backrest, cushions and stanchions upon which the first two are mounted, come totally disassembled (stanchions, cushions backrests and rocking mechanisms are typically shipped individually). Installers must assemble the cushions, backrests and rocking mechanisms on the stanchions, on site, involving multiple manipulations, fastening and subassembly operations.

Also, so called cinema "rockers" and "loungers" have setup limitations with respect to the relative position of the chair vis-à-vis the movie screen or similar structure. Modern theaters feature high slope settings. This means that the chairs for the spectators on the first row and the ones on the last row of the room require different inclination angles, to optimize their visual line to the screen. Mainstream cinema chairs (including "rockers" and "loungers") allow for adjustment of the backrests, but the seats cannot be adjusted in the same fashion. At best, this adjustment is undertaken in a separate operation, keeping in mind that the relative angle between the backrest and seat needs to stay the same to provide an appropriate and comfortable posture to the user (if only the backrest is adjusted, this angle changes).

None of the existing chairs in the prior art, however, include an adjustable plate assembly to regulate the inclination angle of the seat and backrest simultaneously, and a supporting plate that holds the backrest and seat together to simplify installation and maintenance. Additionally, a volumetrically efficient rocker strut assembly with bounce-free characteristics is claimed herein. The resulting chair guarantees an effortless reclining action for the user, ease of installation and maintenance and better comfort configuration conforming to the theater's slope configuration.

Applicant believes that one related reference corresponds to U.S. Pat. No. 5,040,846 issued to Finney et al. on Aug. 20, 1991 for a rocker chair. Finney's patented invention includes a rocking chair with a standard on each side for supporting the chair. A contoured spring guide is attached to each standard that provides a support and deflection profile for leaf springs held in trolleys on each side of the chair. A wing plate extends upwardly from each trolley and terminates in a guide surface. A guide roller is mounted near the top of each standard and provides lateral and longitudinal support for the guide surface the wing plate on each side of the chair. A chair seat is mounted on each trolley and a chair back is mounted between each wing plate. The chair seat and chair back move in unison in a rocking manner as the leaf springs increase and decrease contact along the surface of each spring guide. However, it differs from the present invention because: A) the reclining/rocking effect is attained by a leaf spring instead of the novel strut assembly of the present invention, B) design, manufacture and relative disposition of the fixed and moving elements that allow the rocking effect are different as the figures and descriptions in the present document and these shown in U.S. Pat. No. 5,040,846, and C) the patented chair includes a standard architecture, with the seat and backrest as separate subassemblies, requiring additional installation time.

Applicant believes that another related reference corresponds to U.S. Pat. No. 5,288,128 issued to Smith et al. on Feb. 22, 1994 for reclining theater seating. Smith's patented invention includes backrest and seat mounted upon spaced-apart wings having a substantially inverted, truncated, right triangular shape. The wings are respectively pivotally mounted to the inner sides of a pair of spaced-apart stanchions such that in the upright position of the chair the axis upon which the seat is mounted to the wings is located close to and substantially directly vertically above the axis upon which the wings are pivotally mounted to the respective stanchions. However, it differs from the present invention because: A) the reclining/rocking effect is implemented with a spring instead of a strut assembly as in the present invention, B) design, manufacture and relative disposition of the fixed and moving elements that allow the rocking effect are different as the figures and descriptions in the present document and the one disclosed in U.S. Pat. No. 5,288,128 show, and C) the patented chair includes a standard architecture with the seat and backrest as separate subassemblies.

None of them, however, includes an adjustable plate assembly, a supporting plate and rocker strut assembly with the characteristics claimed herein. The result is a substantially bounce free adjustable reclining chair that has a pre-assembled configuration.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a system for reclining chair of the type that permits the user to assume a reclined position upon occupying the chair, providing a steady, effortless reclining action that results in a comfortable and stable position.

It is another object of this invention to provide a system for a reclining chair that results in easy installation and maintenance procedures, including replacing the strut assemblies that serve as a dampening element for the reclining system.

It is still another object of the present invention to provide a rocker system for a cinema chair that allows simultaneous, but sequential reclining of the backrest and seat, starting with the backrest and continuing with the seat allowing movement of both simultaneously to a comfortable position, but limiting the motion of the seat so the user's feet do not come off the ground when leaning back.

It is yet another object of this invention to provide a system for a reclining chair that allows easy and simultaneous adjustment of the initial inclination angle of the backrest and seat cushion relative to the floor, to optimize the visual line to the screen or stage.

It is another object of this invention to provide a system for a cinema or auditorium reclining chair that permits the user to readily configure the chair to either have a: A) rocker (backrest and cushion recline simultaneously) or B) lounger (only backrest reclines), without requiring additional chair re-design, re-configuration or parts.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
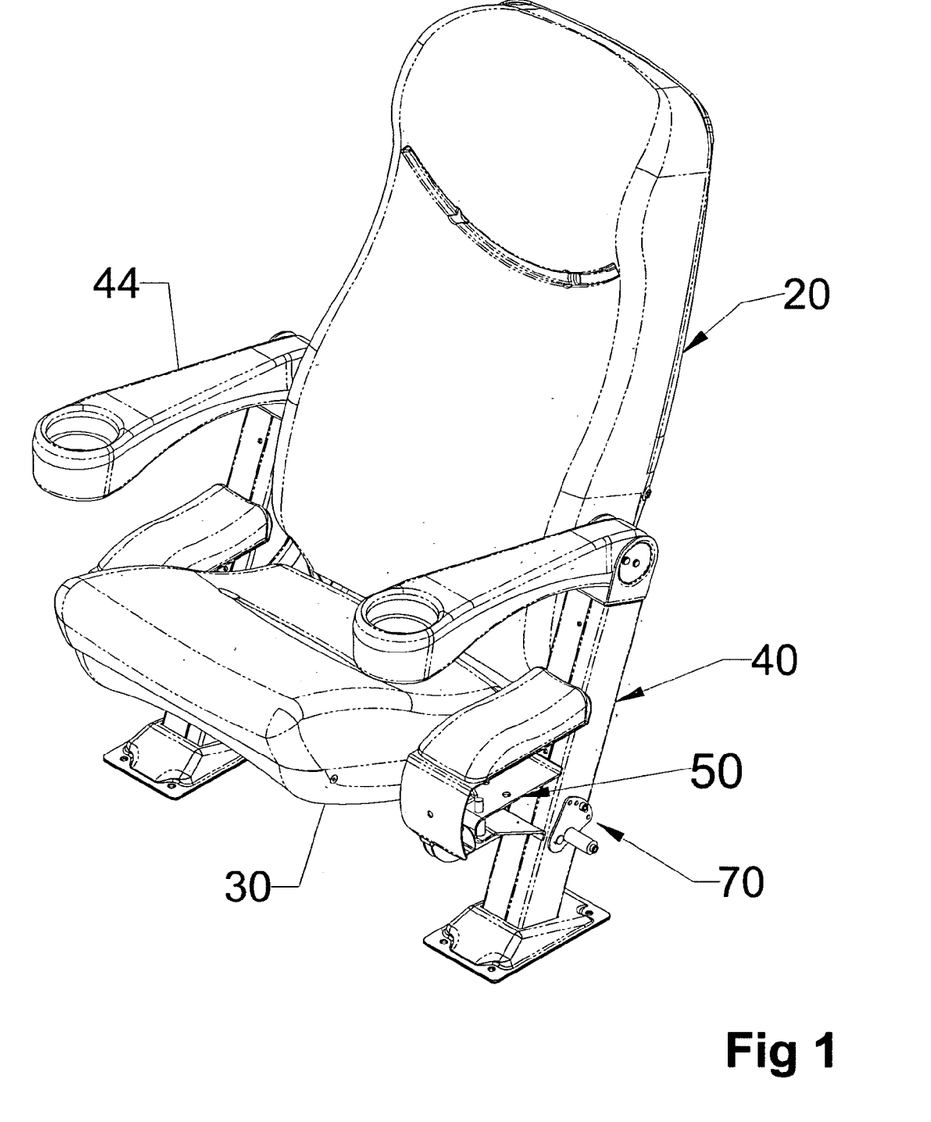
FIG. 1 represents an isometric view of an assembled chair including foam pads, standards, armrests including their cup holders, backrest and seat assembly.
Figure 2:
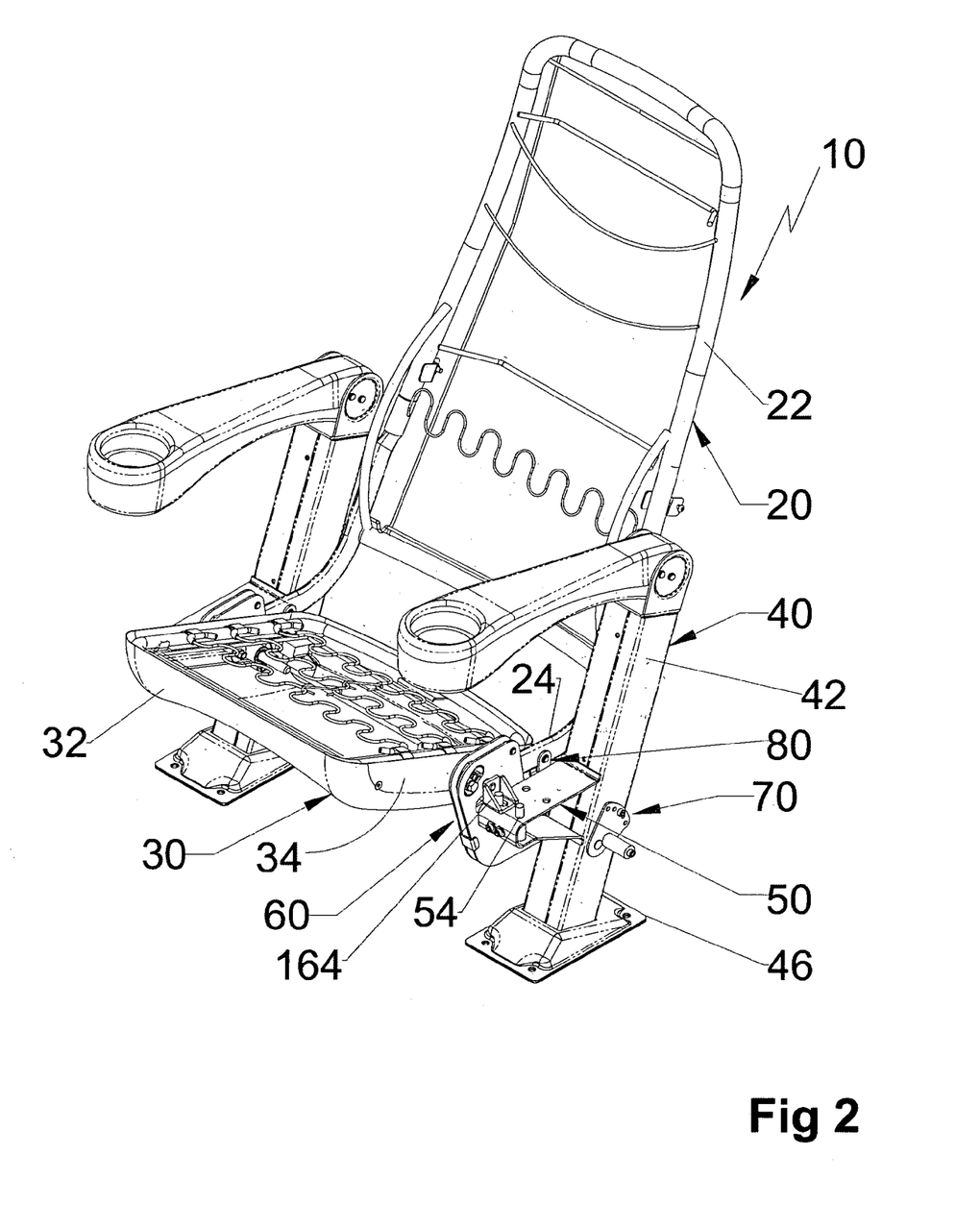
FIG. 2 is an isometric view of the chair represented in FIG. 1 without foam pads.
Figure 3:
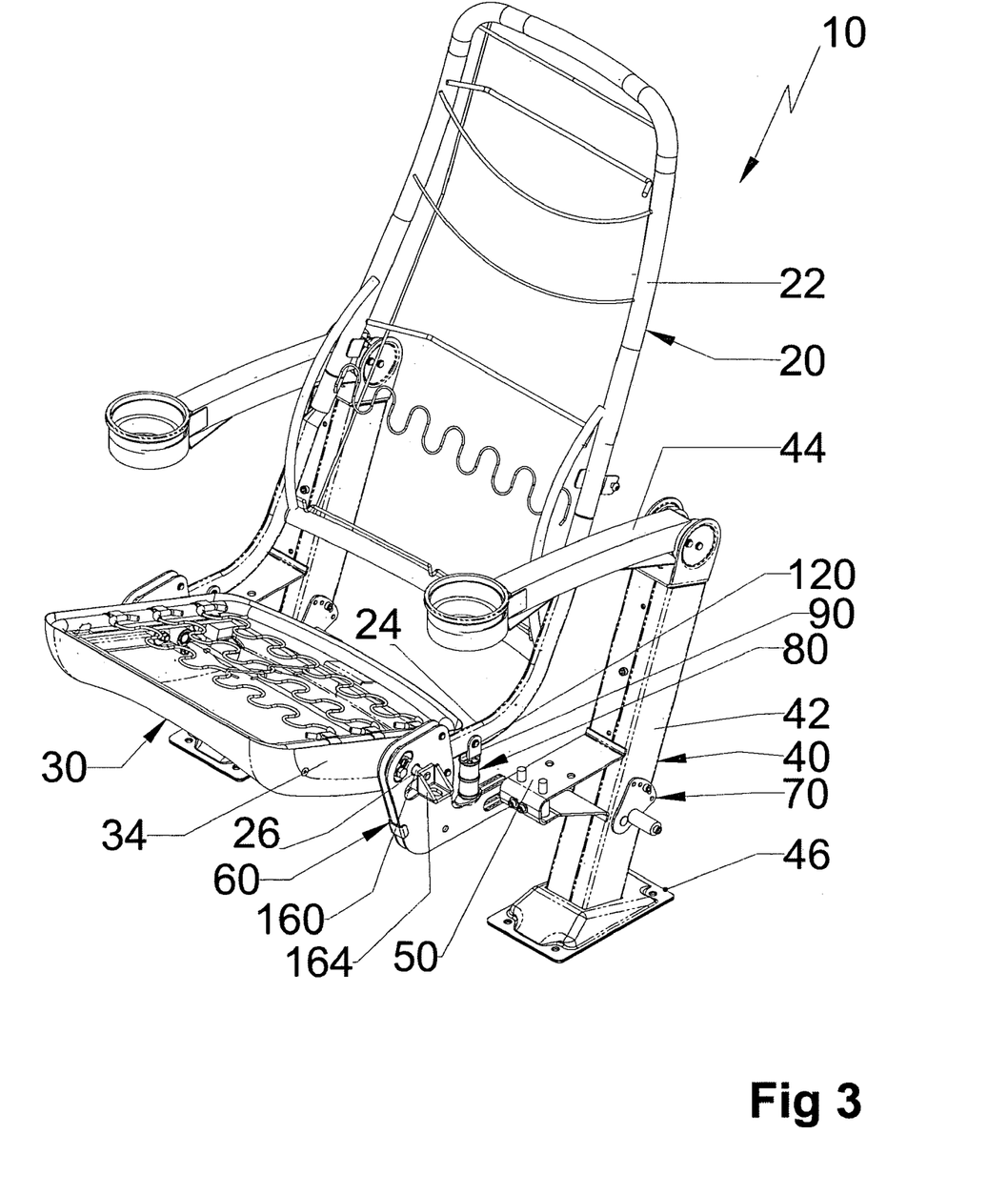
FIG. 3 shows an isometric exploded view of the reclining chair system object of the present application.

Referring now to the drawings, where the present invention is generally referred to with numeral 10, it can be observed that it basically includes backrest assembly 20, seat assembly 30, standard assembly 40, seat and backrest supporting chassis plate assembly 60, position plate assembly 70, and rocker strut assembly 80, as best seen in FIGS. 1, 2 and 3.

Figure 3A:
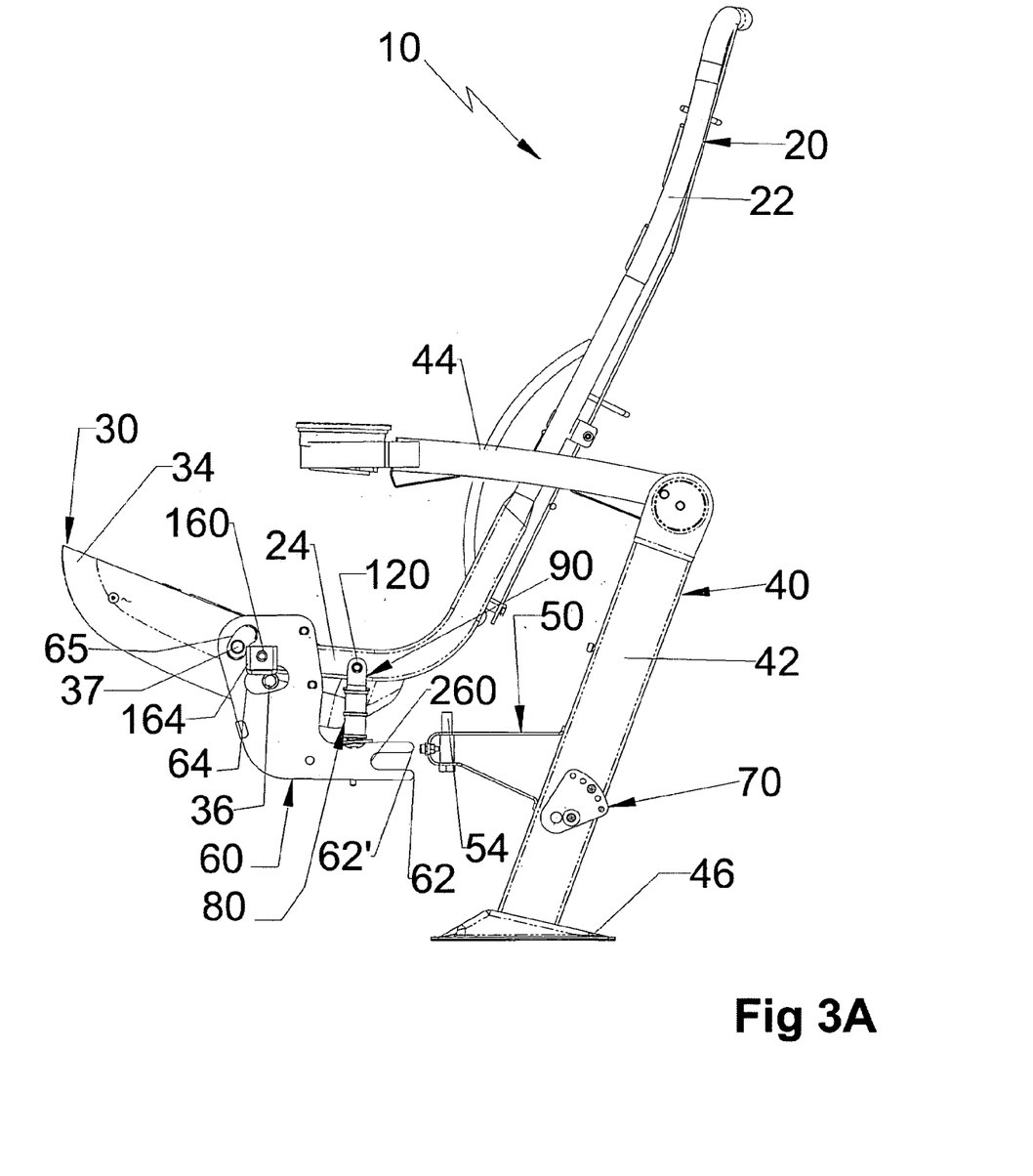
FIG. 3A shows a side exploded elevational view of the chair represented in FIG. 2 with seat and backrest assemblies separated from the standard assembly.
Figures 4, 4A:
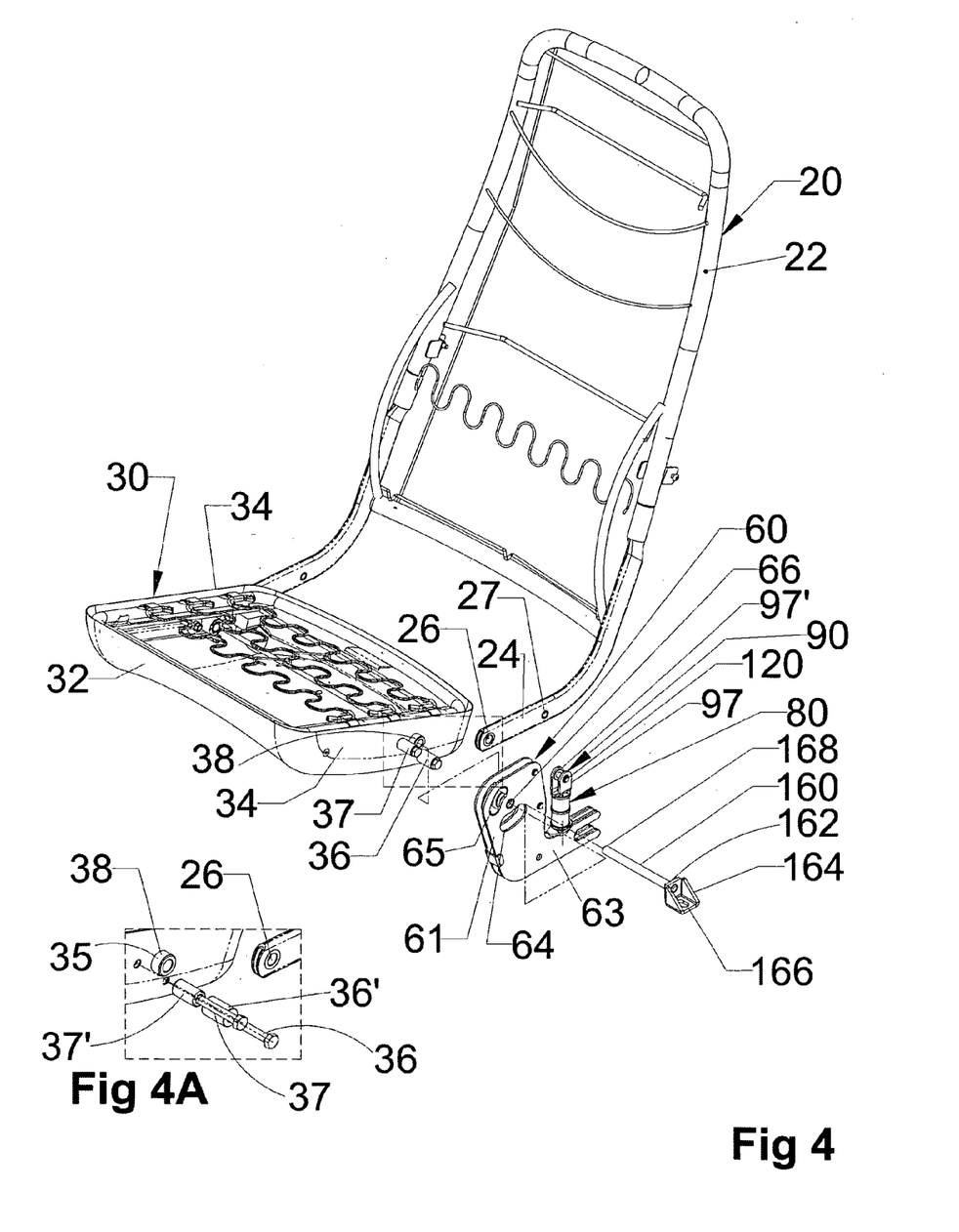
FIG. 4 shows an isometric exploded view of the backrest and seat assemblies of the chair shown in previous figures.
FIG. 4A is an enlarged isometric view of the pivoting point showing the stopper and sleeves being mounted to their corresponding openings in the lateral side of the seat assembly (partially shown).

As shown in FIGS. 3 and 3A, backrest assembly 20 is a unitary piece having a side elevational shape that resembles the letter "L" with a substantially rectangular frame 22. Preferably, frame 22 is made with steel tubular members mounted together, preferably by welding. Lower portion 24 is pivotally mounted to seat assembly 30 at a point that coincides with opening 35 and through opening 26, as best seen in FIG. 4A. Lower portion 24 also includes rocker strut securing opening 27, as seen in FIG. 4.

As seen in FIGS. 3, 3A, 4 and 4A, seat assembly 30 includes seat member 32 with lateral sides 34. Sides 34 include openings 35, rocker pin 36 and stopper pins 37. Pins 36 and 37 are perpendicularly mounted to sides 34, as best seen in FIG. 4A. Preferably, rocker pin 36 and stopper pins 37 include cushion sleeves 36' and 37' to reduce noise and avoid metal-to-metal contact. Spacing bearing tubes 38 are housed within openings 35, as best seen in FIG. 4. As will be discussed below, passing pin 160 passes through openings 66, 26 and 35.

Figure 8:
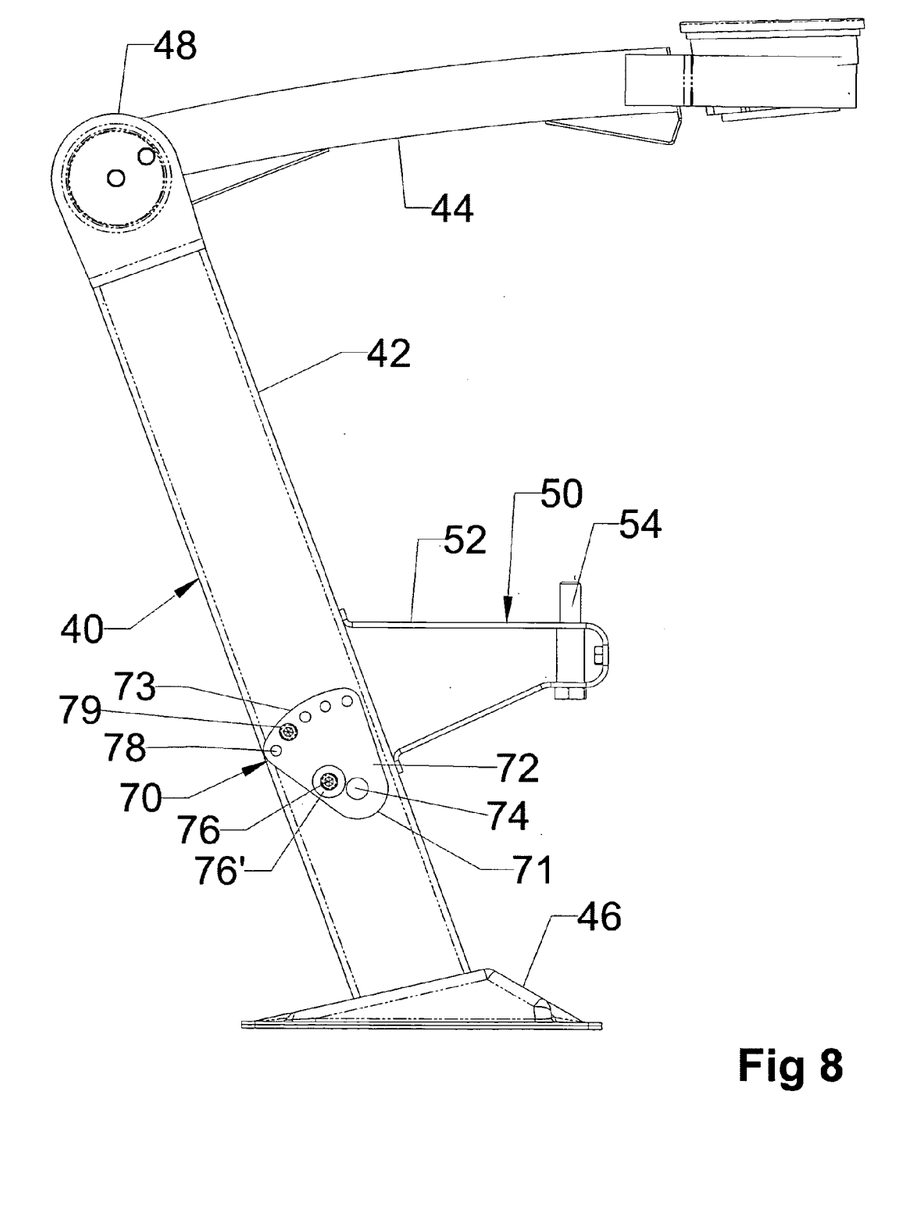
FIG. 8 shows a side elevational view of the chair's standard assembly with the adjustable plate assembly mounted thereto.
Figure 8A:
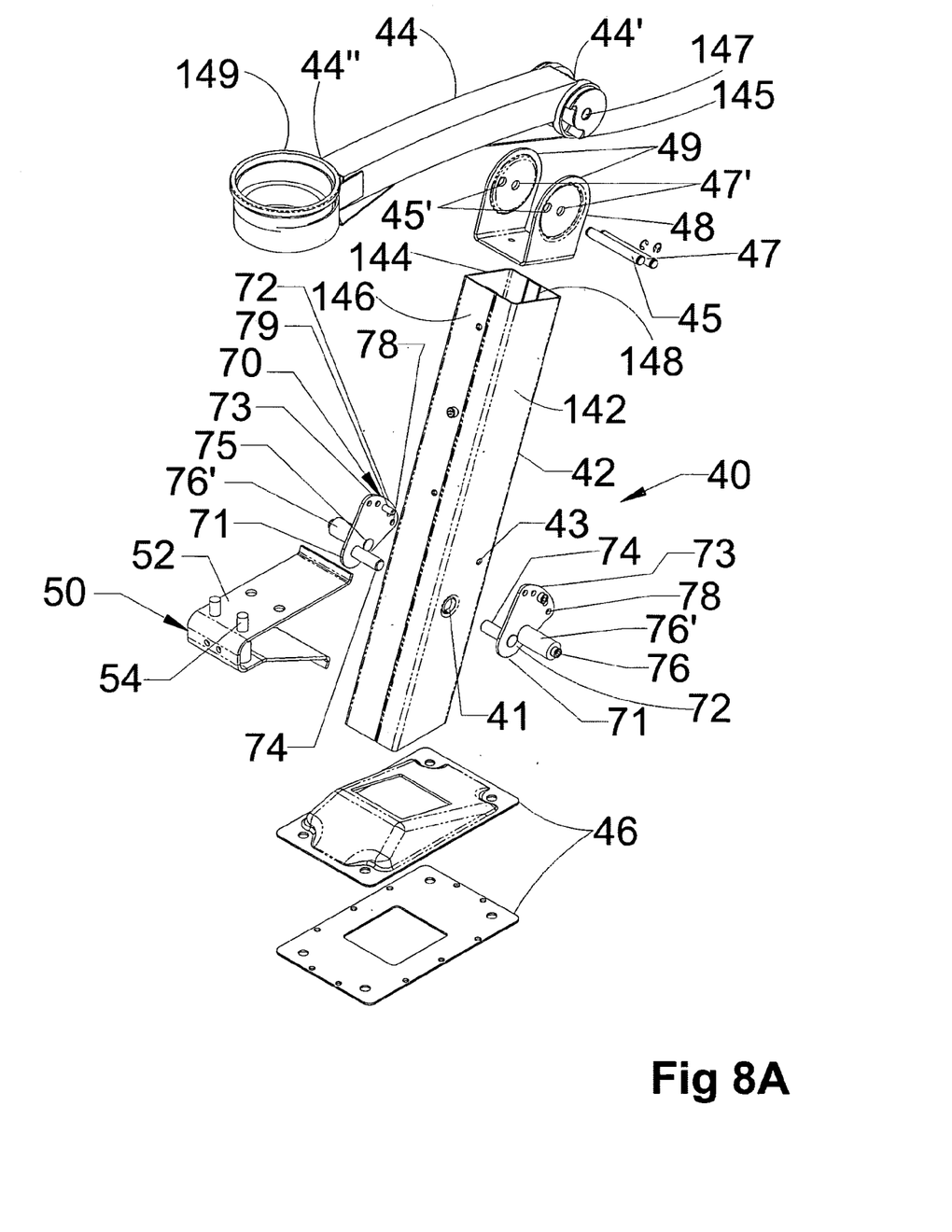
FIG. 8A shows an isometric exploded view of the standard assembly and adjustable plate assembly represented in FIG. 8.

Standard assembly 40 is typically (but not necessarily) mounted to a substantially horizontal supporting surface (not shown). As shown in FIG. 8, standard assembly 40 preferably extends upwardly and rearwardly at an angle between 70° and 80° with respect to a horizontal surface. Assembly 40 includes base 46 typically anchored to a substantially horizontal surface, leg member 42 mounted to base 46 at one end, and armrest member 44 pivotally mounted to the other end of member 42 with pivoting bracket 48. Pivoting bracket 48 is mounted to the upper end of member 42, as shown in FIG. 8. As best seen in FIG. 8A, bracket 48 includes parallel and spaced apart plates 49 for cooperatively receiving end 44' therein between. Pin 47 passes through holes 47' and 147 thereby pivotally supporting end 44'. Stopper pin 45 passes through holes 45' and coacts with cutout 145 to limit the pivoting angle. Preferably, end 44" includes a cup holder 149 mounted thereon. Leg member 42 has preferably a substantially square cross section with walls 142, 144, 146 and 148. Leg member 42 also includes axle receiving opening 41 and opening 43 in each of walls 142 and 144. Leg member 42 also includes mounting plate member 50, which has a substantially triangular shape in the preferred embodiment. Mounting plate member 50 is rigidly mounted to wall 146 a predetermined distance from base 46. Mounting plate member 50 includes upper surface 52 with supporting pin 54 perpendicularly mounted thereon, adjacent to its distal end. Upper surface 52 may include more than one supporting pin 54 if there is a contiguous chair.

Figure 5:
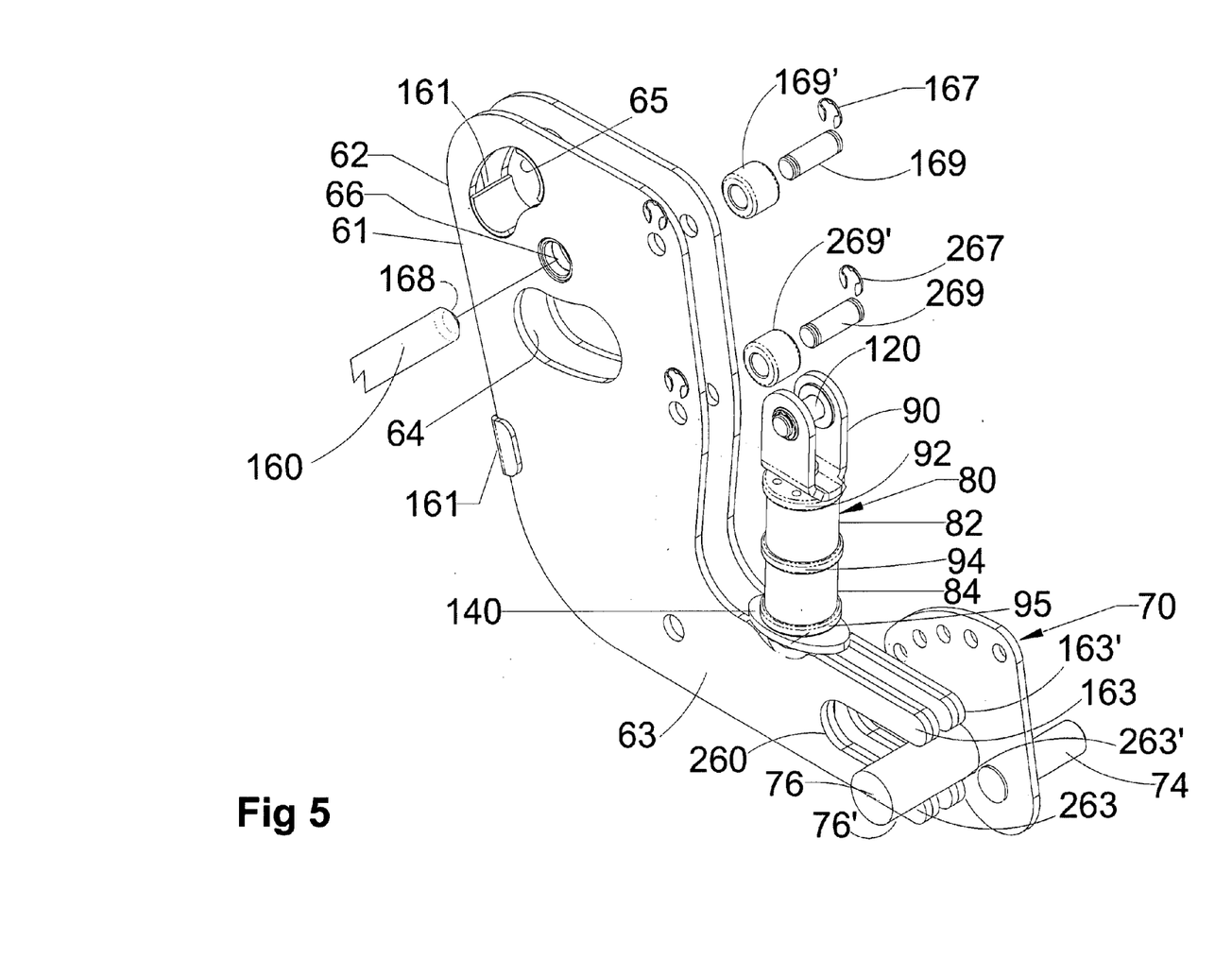
FIG. 5 is an isometric view showing the support plate assembly with rocker strut and position plate assemblies mounted thereto.
Figure 5A:
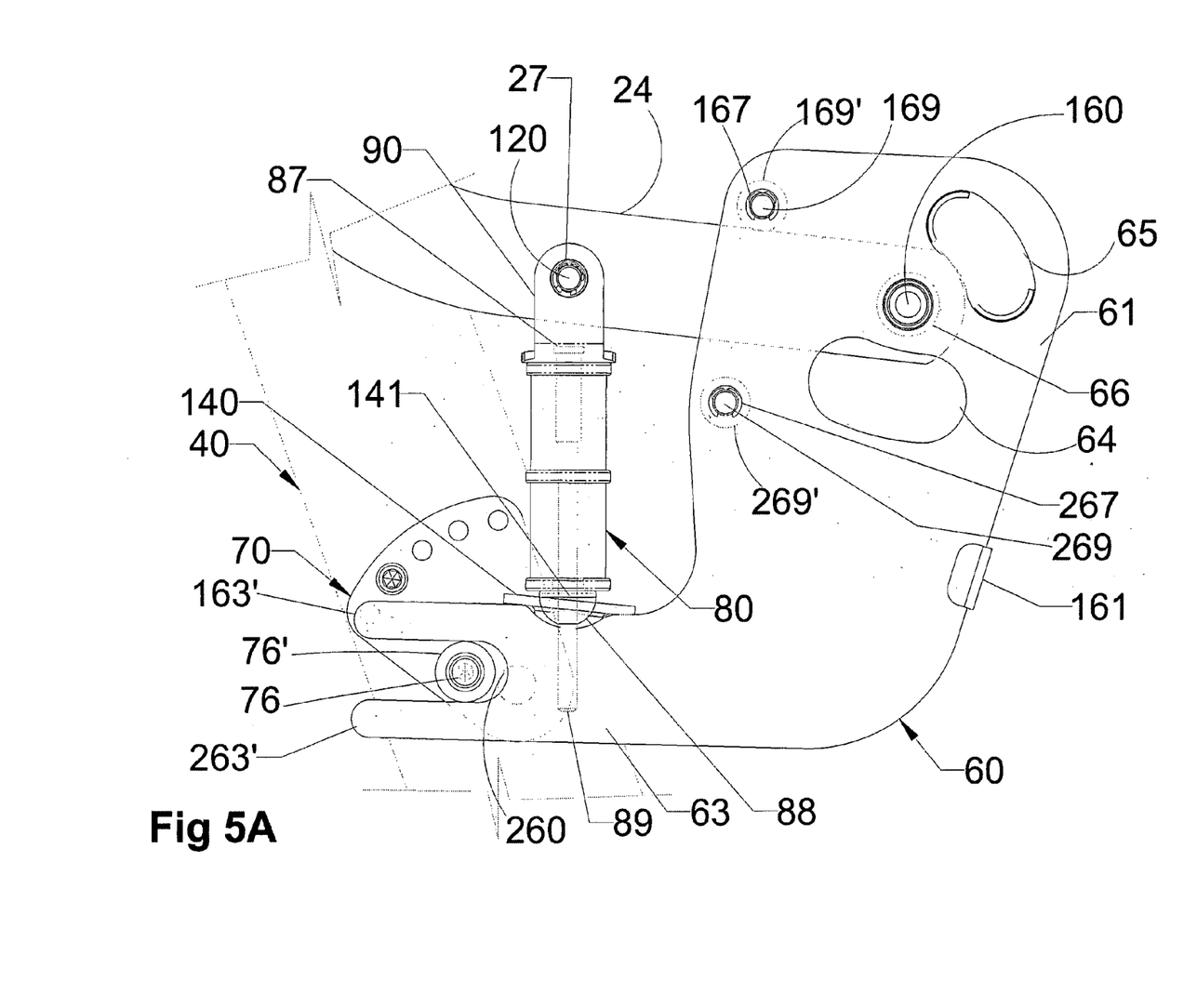
FIG. 5A represents a side elevational view of the assemblies shown in FIG. 5.
Figure 8B:
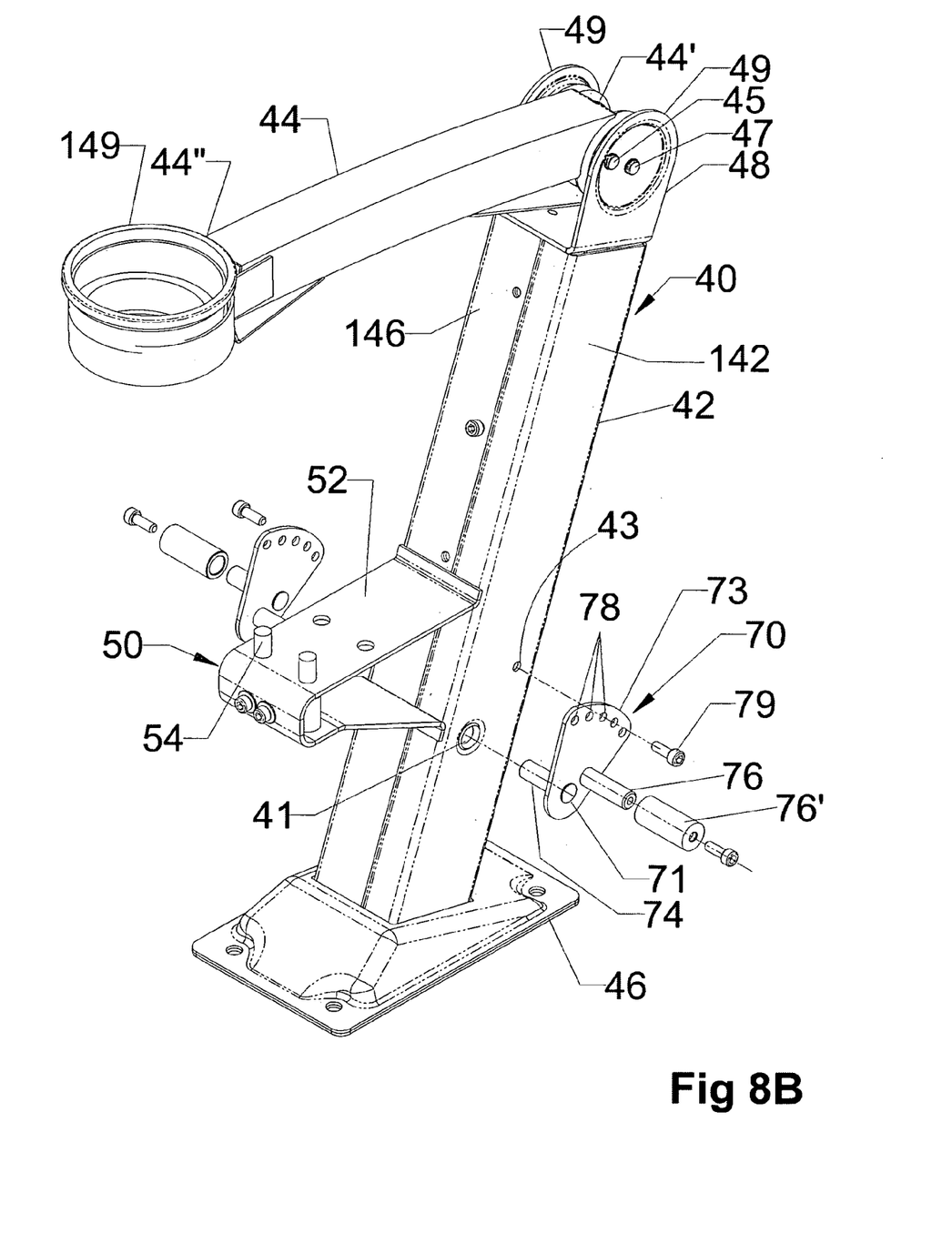
FIG. 8B shows an isometric view of the standard assembly and adjustable plate assembly represented in FIG. 8.

As best seen in FIGS. 8 and 8A plate assembly 70 includes plate 72 with axle 74 and axle 76 mounted to plate 72. Sleeve 76' covers axle 76 and avoids metal to metal contact with bay 260, as shown in FIGS. 5 and 5A. As best seen in FIG. 8A, plates 72 are mounted to walls 142 and 144, which are in a parallel and spaced apart relationship with respect to each other. If there are two contiguous chairs, then two plates 72 are needed. Plate 72, includes narrow end 71, wide end 73, and setting openings 78. One end of axle 74 is perpendicularly mounted to one surface of plate 72 at a predetermined distance from and substantially adjacent to narrow end 71. The other end of axle 74 is received by opening 41 of standard assembly 40, as best seen in FIG. 8A. One end of axle 76 is eccentric and perpendicularly mounted to the opposite surface of plate 72. The other end of axle member 76 is engaged within bay 260, between bifurcated fingers 163 and 263 (also between 163' and 263') of seat supporting chassis plate assembly 60, as best seen in FIGS. 5 and 5A. Setting openings 78 are aligned next to wide end 73 in a space apart relationship with respect to each other. Fastening member 79 passes through one of setting openings 78 and is secured to standard assembly 40 through opening 43, as best seen in FIG. 8B. Depending on the angle desired for setting backrest assembly 20 as well as seat assembly 30 with respect to standard assembly 40, a cooperative opening 78 is selected. Typically, the person who installs reclining chair system 10 selects this setting depending on the location with respect to the stage or screen.

The purpose of standard assembly 40 is to provide support for backrest and seat assemblies 20 and 30, (which are joined together by chassis plate assembly 60) as well as for armrest member 44. Assembly 40 constitutes the chair's structural support to the floor or supporting surface. Standard assembly 40 provides two points of support for: a) plate assembly 70 on side walls 142 or 144; and b) mounting plate member 50.

As seen in FIGS. 4, 5 and 5A, chassis or supporting plate assembly 60 includes identical plate members 62, kept in a spaced apart and parallel relationship with respect to each other with separators 161. Separators 161 are preferably welded to plate members 62. Plate member 62 has an L-shape with arms 61 and 63 substantially perpendicular to each other. Arm 61 is wider than arm 63. Arm 61 includes through openings 64, 65 and 66. Plate 140 is rigidly mounted to arms 63. Plate 140 has central opening 141, as best seen in FIG. 5A. Openings 64 and 65 removably receive rocker pin 36 and stopper pins 37, respectively, as best seen in FIG. 3A. As best seen in FIG. 4, seat supporting chassis plate assembly 60 also includes passing pin 160 with ends 162 and 168. End 162 includes connecting member 164 rigidly mounted thereon. Connecting member 164 includes opening 166. End 168 passes through openings 66 (of the outer plate), opening 26, opening 66 (of the inner plate) and opening 35. Connecting member 164 at end 162 of pin passing 160 includes opening 166 with cooperative dimensions to receive supporting pin 54, as best seen in FIG. 2.

Stopper pins 169 and 269 are mounted between plate members 62 and are covered with sleeves 169' and 269', respectively to avoid metal-to-metal contact. Pins 169 and 269 are kept a place with locking rings 167 and 267, respectively. Pins 169 and 269 coact with lower portion 24 to limit the pivoting action of the latter.

Figure 6:
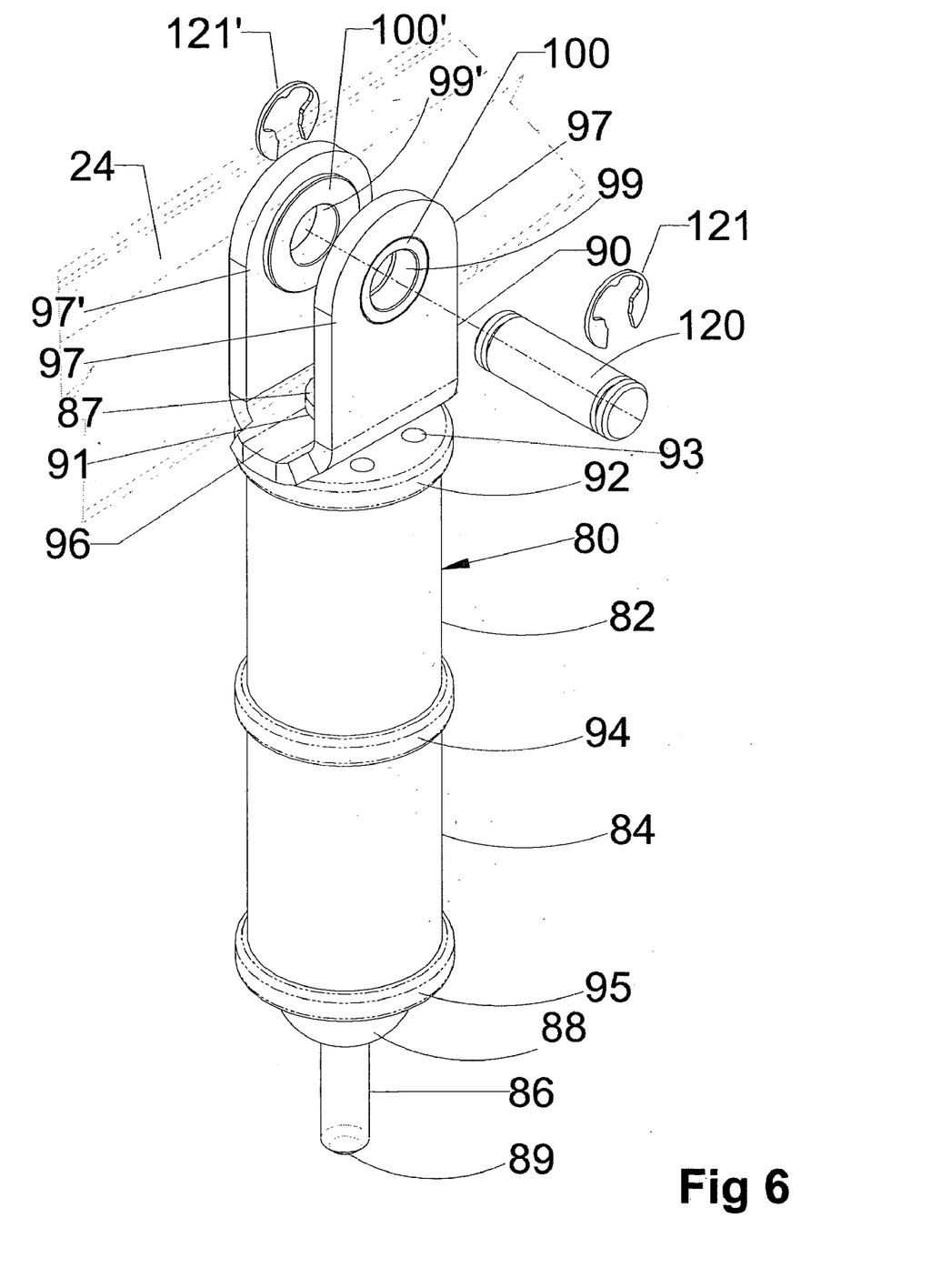
FIG. 6 illustrates an isometric view of the rocker strut assembly.
Figure 7:
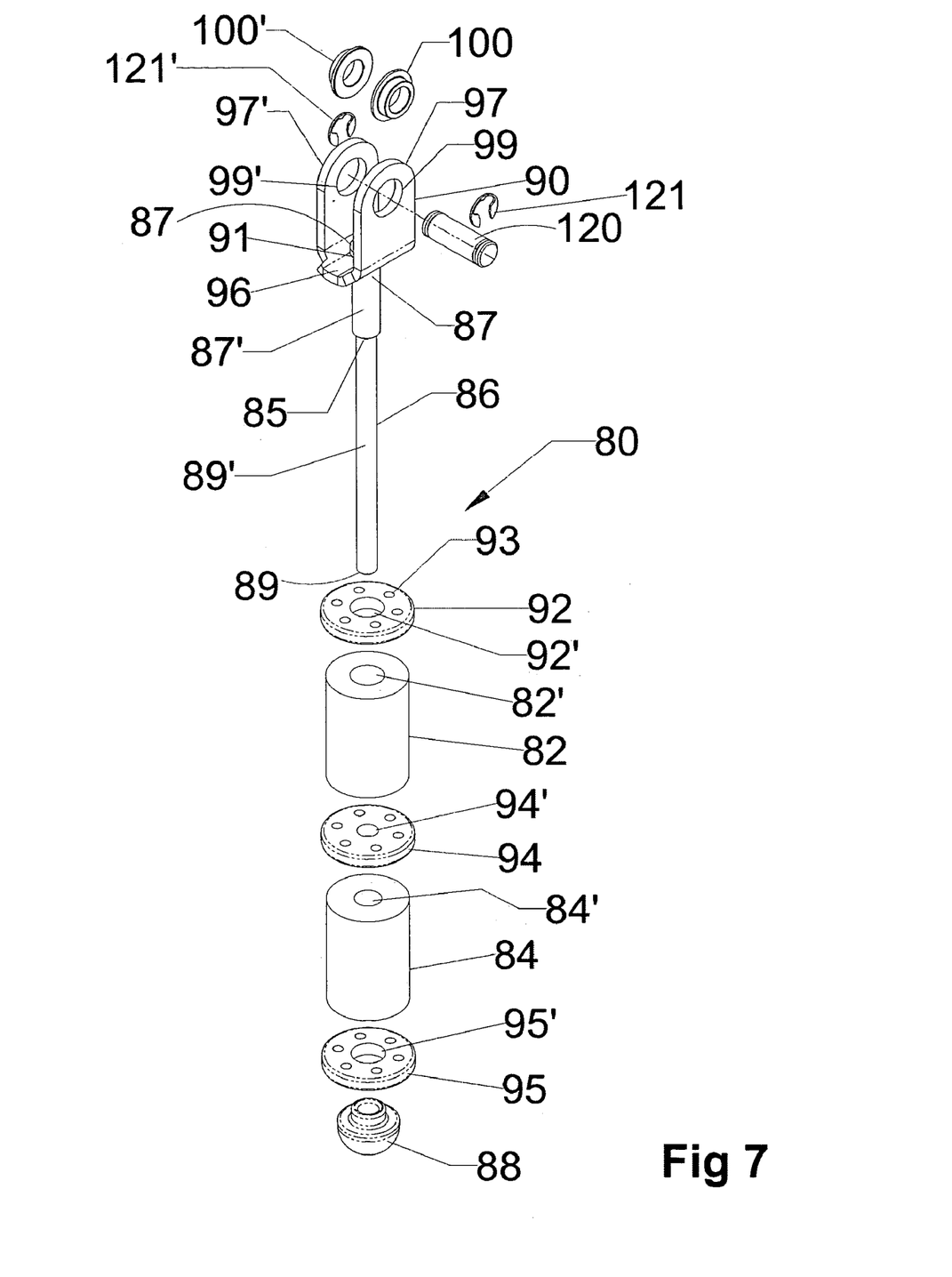
FIG. 7 represents an exploded view of the rocker strut assembly.

Rocker strut assembly 80, shown in FIGS. 6 and 7, cushions the weight of a user. Space in the area where strut assembly 80 is installed is very limited. The present invention addresses this problem. As best seen in FIG. 7, rocker strut assembly 80 includes stepped or headed shaft member 86 with head end 87, distal end 89 and portions 87' and 89' next to head end 87 and distal end 89, respectively. Step 85 divides portions 87' and 89'. Portion 87' has a larger diameter than portion 89'. Head end 87 is pivotally mounted to backrest assembly 20 at rocker strut securing opening 27, as seen in FIG. 5A.

Figure 6A:
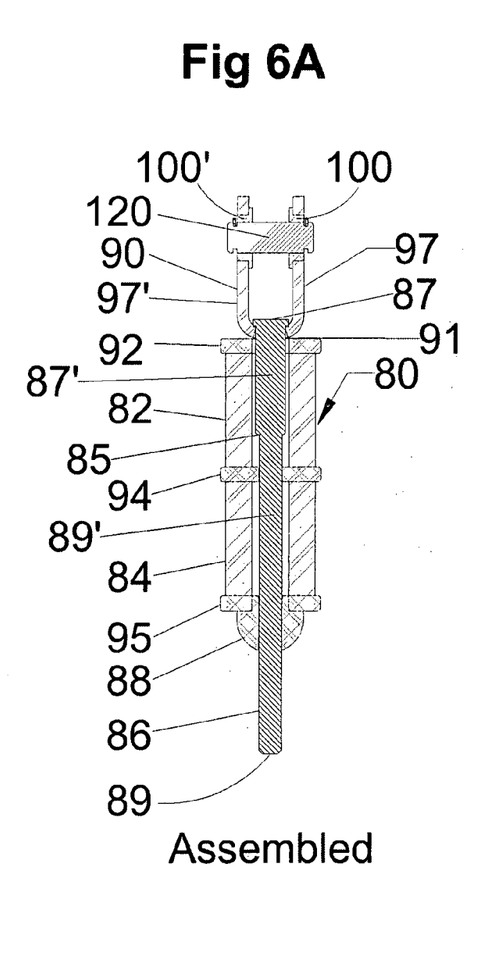
FIG. 6A is a cross section view of the rocker strut assembly in a rest position.
Figure 6B:
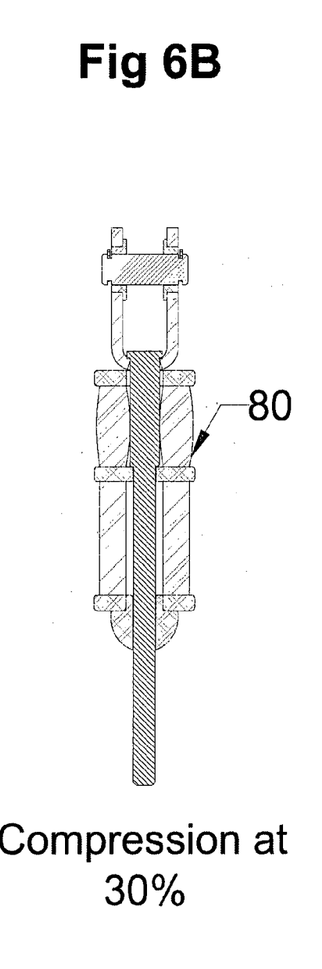
FIG. 6B is a cross section view of the rocker strut assembly when upper rubber cylinder is compressed to approximately 30%.
Figure 6C:
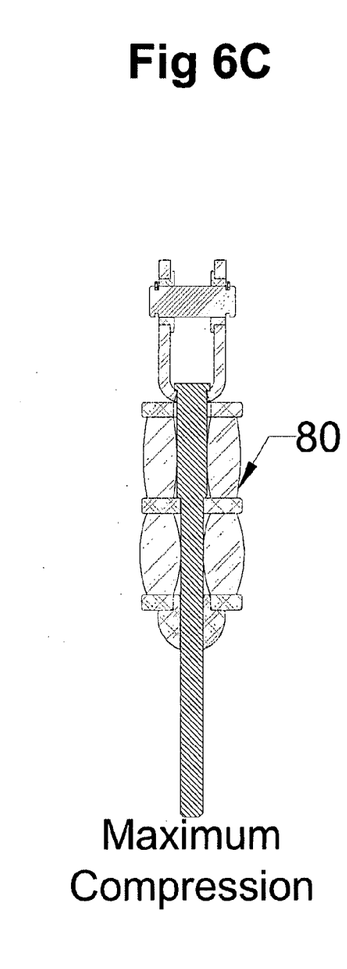
FIG. 6C is a cross section view of the rocker strut assembly when upper and lower rubber cylinders are in maximum permitted compression.

As best seen in FIG. 7, strut assembly 80 includes upper spacer 92 that has, in the preferred embodiment, a circular shape with perforations 93 and central opening 92' to slidably receive shaft 86 therethrough. Spacer 92 is preferably made out of nylon. Distal end 89 of headed shaft member 86 passes through ball joint 88. Ball joint 88 is made out of a hard plastic or polymer base material such as nylon. Sandwiched between ball joint 88 and upper spacer 92 are upper rubber cylinder 82, middle spacer 94, lower rubber cylinder 84 and lower spacer 95 with their respective coaxially aligned central through openings 82', 94', 84' and 95'. Cylinders 82 and 84 are made out of a compressible and resilient material such as rubber or equivalent. Central through openings 94' of middle spacer 94 has a smaller diameter than the diameter of portion 87'. The weight of a user causes step 85 to travel initially towards middle spacer 94, as best seen in FIGS. 6A, 6B and 6C.

After headed shaft member 86 has traveled a predetermined distance no further compression of cylinder 82 is allowed by spacer 94. This prevents additional compression on compressible and resilient upper rubber cylinder 82 preferably not beyond its 30% compression, in the preferred embodiment. It has been found that rubber cylinders deteriorate more rapidly if their compression exceeds 30% of their height. In the same fashion, compression of cylinder 84 is limited by stopper 169, as lower member 24 leans upon it. Upper and lower rubber cylinders 82 and 84 compress against each other with the weight of a user and resiliently recuperate their shapes upon the release of the weight.

In practice, the inventor observed that, as the chair user lean back, thus exerting pressure on the strut assembly, upper cylindrical member 82 compressed more before the lower rubber cylinder 84. This required the use of step 85 to limit the compression of upper cylinder member 82. Also, the inwardly expansion of the upper cylindrical member 82 touches shaft 86 creating a braking effect that contributes to the stabilization of the final compressed state and position of the chair. In a way, this gripping effect makes the rotation or movement of backrest assembly 20 (and seat assembly 30) less dependant on the application or release of the weight of the user. Member 84 also touches shaft 86 in the same manner, although to a lesser extent, given the smaller diameter of shaft 86 between step 85 and distal end 89. The braking effect is present in most of the compression and decompression length of the strut (assuming the user weighs more than what is required to deform cylinder 82 to the limit imposed by step 85). In essence, this structure diminishes the resistance that the resilient strut assembly exerts in the direction opposite to reclination, thus providing for the user a stable position at any point of strut travel. Therefore, rocker strut assembly 80 provides a compressible element with diminished resilience to reclining chair 10 that is smoothly and comfortably overcome by a user's weight, and yields a stable reclined position.

Backrest receiver and stopper fork member 90 is, in the preferred embodiment a unitary piece, and includes two parallel and spaced apart plates 97 and 97' with through openings 99 and 99', respectively, as seen in FIGS. 6 and 7. Plates 97 and 97' are rigidly and perpendicularly joined to spacer plate 96 that includes through opening 91 through which head end 87 is secured to plate 96, as best seen in FIG. 6. Bushing members 100 and 100' are mounted inside through openings 99 and 99', respectively. As seen in FIG. 5A, lower portion 24 of backrest assembly 20 is mounted to backrest receiver and stopper fork member 90 with passing pin 120 as best seen in FIGS. 3, 3A and 5A. Passing pin 120 is kept in place with locking rings 121 and 121', shown in FIGS. 6 and 6A. Spaced apart plates 97 and 97' are secured to lower portion 24 by passing pin 120, which passes through rocker strut securing opening 27 as well as openings 99 and 99' (see FIGS. 5A, 6, 7). Lower end 89 of shaft 86 is mounted to plate 140, which is rigidly mounted to the upper edge of arms 63 and 63'. Distal end 89 of stepped shaft member 86 passes through central through opening 141 of plate 140, as best seen in FIGS. 5 and 5A.

One of the features of the present invention is that in conventional theater seat, the backrest moves back and the seat assembly stays at substantially the same position. The present invention achieves a rocker effect whereby the angular relationship of the seat and backrest assemblies is preserved when a user leans back. In operation, lower portion 24 coacts with rocker pin 36 and any backward movement of backrest assembly 20 is transmitted to seat assembly 30 angularly lifting it in proportion to the movement of assembly 20. In turn, by removing rocker pin 36, the present invention may also behave as a cinema "lounger" chair, wherein only the backrest reclines and the seat assembly stays at substantially the same position.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A reclining chair system, comprising:
   A) a seat assembly having front, rear and two lateral sides each of said lateral sides including a perpendicularly mounted rocker pin;
   B) an L-shape backrest assembly having lower and upper portions substantially perpendicular to each other and said backrest assembly being pivotally mounted to said seat assembly, said lower portion cooperatively coacting with said rocker pin to cause said seat assembly to move angularly in proportion with a backward angular movement of said upper portion thereby achieving a rocker effect;
   C) a standard assembly;
   D) supporting means including an L-shape member having first and second perpendicularly disposed arms, said first arm being pivotally mounted to said seat assembly and to said lower portion, said first arm being rigidly mounted to said standard assembly, and said second arm having a distal end mounted to said standard assembly, said supporting means further including first and second stopper means for limiting the rotation between two extreme positions of said seat and backrest assemblies, respectively, with respect to said supporting means; and
   E) a strut assembly having first and second ends, said first end being pivotally mounted to said lower portion at a point separated a predetermined distance from the pivoting point of said supporting means with said seat and backrest assemblies, and said second end being mounted to said second arm.

2. The reclining chair system set forth in claim 1 wherein said strut assembly includes first and second compressible and resilient members, abuttingly and coaxially disposed with respect to each other wherein the distal ends of said first and second compressible and resilient members define said first and second ends of said strut assembly.

3. The reclining chair system set forth in claim 2 wherein said strut assembly includes first and second spacers at said distal ends.

4. The reclining chair system set forth in claim 3 wherein said strut assembly includes a central spacer between said first and second resilient members.

5. The reclining chair system set forth in claim 4 wherein said first and second spacers, first and second compressible and resilient members and said central spacer include each a coaxially aligned central through opening and said strut assembly further includes an elongated shaft having a headed end and a distal termination, said shaft being receivable through said coaxially aligned central through opening and said headed termination being cooperatively disposed to coact with said first spacer and said header termination defining said first end of said strut assembly.

6. The reclining chair system set forth in claim 5 wherein said shaft includes a step defining first and second shaft portions, said first shaft portion being adjacent to said distal termination and having a smaller diameter than said second shaft portion, and said central spacer having a diameter smaller than said second shaft portion but larger than the diameter of said first shaft portion, said step cooperatively coacting to prevent further compression of said first compressible and resilient member beyond a predetermined magnitude.

7. The reclining chair system set forth in claim 6 wherein the compression of said first and second compressible and resilient members cause the latter to expand laterally and coact with said first and second shaft portions, respectively, thereby providing a gripping action that stabilizes the relative position of said shaft.

8. The reclining chair system set forth in claim 1 further including adjusting means for changing the relative position of said supporting means with respect to said standard assembly thereby adjusting the angular position of said backrest and seat assemblies with respect to said standard assembly.

9. The reclining chair system set forth in claim 8 wherein said adjusting means includes a plate with third and fourth ends and first and second surfaces, including at least two through holes positioned adjacent to said third end and a first pin perpendicularly mounted on said first surface adjacent to said fourth end and a second pin perpendicularly mounted to said second surface at a predetermined distance between said through holes and said first pin, said first pin being mounted to said standard assembly said second pin cooperatively coacting with said supporting means and further including fastening means that cooperate with said through holes to set said adjusting means at selected predetermined positions so that the relative position of said supporting means with respect to said standard is adjusted.

* * * * *